United States Patent
Marshall et al.

(10) Patent No.: US 12,049,816 B2
(45) Date of Patent: *Jul. 30, 2024

(54) AUGMENTED REALITY SYSTEM FOR USE IN HORIZONTAL DIRECTIONAL DRILLING OPERATIONS

(71) Applicant: The Charles Machine Works, Inc., Perry, OK (US)

(72) Inventors: Bradley S. Marshall, Perry, OK (US); Scott B. Cole, Edmond, OK (US); Jacob Harman, Stillwater, OK (US); Klayton Day Jones, Perry, OK (US); Brian K. Bailey, West Des Moines, IA (US); Victor D. Camara Puerto, Eden Prairie, MN (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,766

(22) Filed: Apr. 20, 2023

(65) Prior Publication Data

US 2023/0258071 A1    Aug. 17, 2023

Related U.S. Application Data

(63) Continuation of application No. 16/990,462, filed on Aug. 11, 2020, now Pat. No. 11,639,661.

(60) Provisional application No. 62/885,594, filed on Aug. 12, 2019.

(51) Int. Cl.
*E21B 7/04* (2006.01)
*E21B 47/092* (2012.01)
*G06T 11/00* (2006.01)
*E21B 7/02* (2006.01)

(52) U.S. Cl.
CPC ............ *E21B 47/092* (2020.05); *E21B 7/046* (2013.01); *G06T 11/00* (2013.01); *E21B 7/02* (2013.01)

(58) Field of Classification Search
CPC ............................ E21B 7/046; G06T 19/006
See application file for complete search history.

(56) References Cited

U.S. PATENT DOCUMENTS

| | | | |
|---|---|---|---|
| 6,094,625 | A | 7/2000 | Ralston |
| 6,315,062 | B1 | 11/2001 | Alft et al. |
| 8,358,201 | B1 | 1/2013 | Haddy |
| 8,918,246 | B2 | 12/2014 | Friend |

(Continued)

*Primary Examiner* — Giovanna Wright
(74) *Attorney, Agent, or Firm* — Tomlinson McKinstry, P.C.

(57) ABSTRACT

A system for tracking and steering a downhole tool using an augmented reality device. A tracker tracks the location of a downhole tool as it moves underground and transmits data to the device, while one or more sensors measure a position and orientation of the device. The device analyzes the data received from the tracker and the sensors and generates a virtual image of the downhole tool. The virtual image is displayed on the device at its detected location relative to the ground surface and relative to the position of the device. The position of the displayed virtual image is modified in response to updated information from the tracker or the sensors. Virtual images representing various parameters of the drilling operation are also displayed on the device in juxtaposition with the virtual image of the downhole tool.

20 Claims, 12 Drawing Sheets

(56) References Cited

U.S. PATENT DOCUMENTS

| | | |
|---|---|---|
| 10,235,789 B2 | 3/2019 | Simmons et al. |
| 10,460,523 B1 | 10/2019 | Haddy |
| 11,639,661 B2 * | 5/2023 | Marshall ............... E21B 47/092 |
| | | 175/45 |
| 2014/0222526 A1 | 8/2014 | Shakil et al. |
| 2020/0190963 A1 * | 6/2020 | Gooneratne ............ E21B 17/02 |

* cited by examiner

AUGMENTED REALITY SYSTEM FOR USE IN HORIZONTAL DIRECTIONAL DRILLING OPERATIONS

SUMMARY

The present disclosure is directed to a system comprising a drill rig supported on a ground surface, a downhole tool positioned beneath the ground surface, and a drill string having a first end and a second end, in which the first end of the drill string is attached to the downhole tool and the second end of the drill string is attached to the drill rig. The system further comprises a portable, above-ground tracker having an antenna configured to detect a magnetic dipole field emitted from the downhole tool, and an augmented reality device having a field of view and a screen, in which the screen depicts one or more images within the field of view, and one or more sensors supported on the device and configured to determine a position of the device relative to the downhole tool. The system further comprises one or more controllers in communication with the device, the tracker, and the one or more sensors. The one or more controllers are configured to determine a position and orientation of the downhole tool, generate a virtual image of the downhole tool relative to the ground surface based on the information received from the tracker and the one or more sensors, and display the virtual image on the screen.

The present disclosure is also directed to a method. The method comprises the steps of driving a downhole tool attached to a drill string along an underground borepath, and tracking a location of the downhole tool using a portable, above-ground tracker. The method further comprises the steps of transmitting the location of the downhole tool to an augmented reality device, and generating a virtual image of a position of the downhole tool relative to the ground surface.

DETAILED DESCRIPTION

Figure 1:
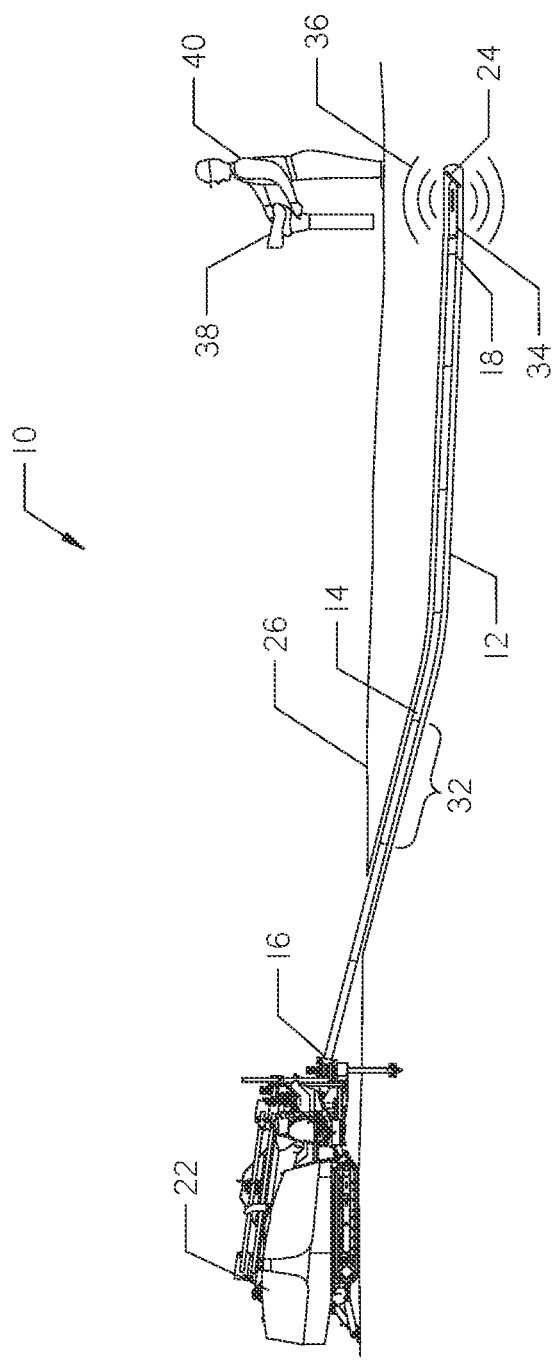
FIG. 1 is an illustration of a horizontal directional drilling operation.
Figure 10:
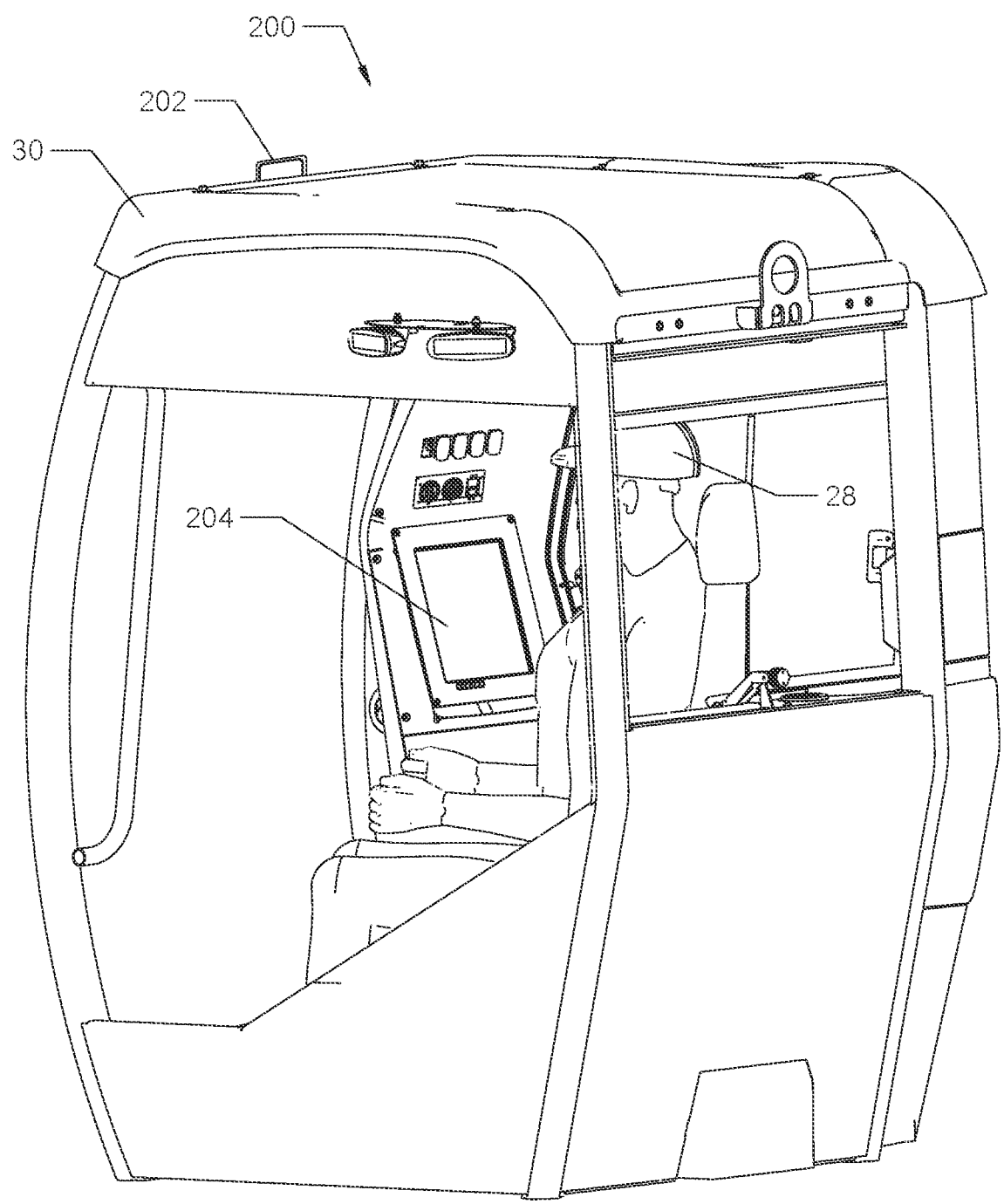
FIG. 10 is a perspective view of an operator station supported on the drill rig shown in FIG. 1. Another embodiment of an augmented reality device is supported on the operator station.

With reference to FIG. 1, a horizontal directional drilling system 10 is shown. The system 10 is used to create a borehole 12 under an above-ground obstacle, such as a roadway. The system 10 uses a drill string 14 having a first end 16 and a second end 18. The drill string 14 is attached to a drill rig 22 at its first end 16 and a drill bit 24 at its second end 18. The drill rig 22 is supported on a ground surface 26 and is operated by a rig operator 28 positioned at an operator station 30, as shown in FIG. 10. The drill string 14 transmits thrust and rotation force from the drill rig 22 to the drill bit 24.

The drill string 14 is made up of a plurality of hollow pipe sections 32 arranged in an end-to-end relationship. In some embodiments, each pipe section is made of a single pipe section. In other embodiments, each pipe section comprises an inner pipe section disposed within an outer pipe section. Such pipe sections, when joined together, make up an inner and outer drive train.

Continuing with FIG. 1, a downhole tool 34 is attached to the second end 18 of the drill string 14. The downhole tool 34 carries the drill bit 24 and houses a beacon. The beacon is configured to emit a magnetic dipole signal 36. An above-ground tracker 38, operated by a tracker operator 40, is configured to detect and analyze the beacon signal 36 in order to determine the downhole position of the beacon. The beacon signal 36 includes information about the beacon as well as the downhole conditions, such as temperature and fluid pressure. One embodiment of a tracker and its methods of use are described in U.S. Pat. No. 7,786,731 issued to Cole et al., the contents of which are incorporated herein by reference.

The drill bit 24 shown in FIG. 1 comprises a slant face. The slant face is used to steer the downhole tool 34 as it bores. The angled nature of the slant face directs the downhole tool 34 in different directions depending on the tool's roll position—the direction the slant face is facing as the downhole tool 34 rotates about its horizontal axis.

Figure 9:
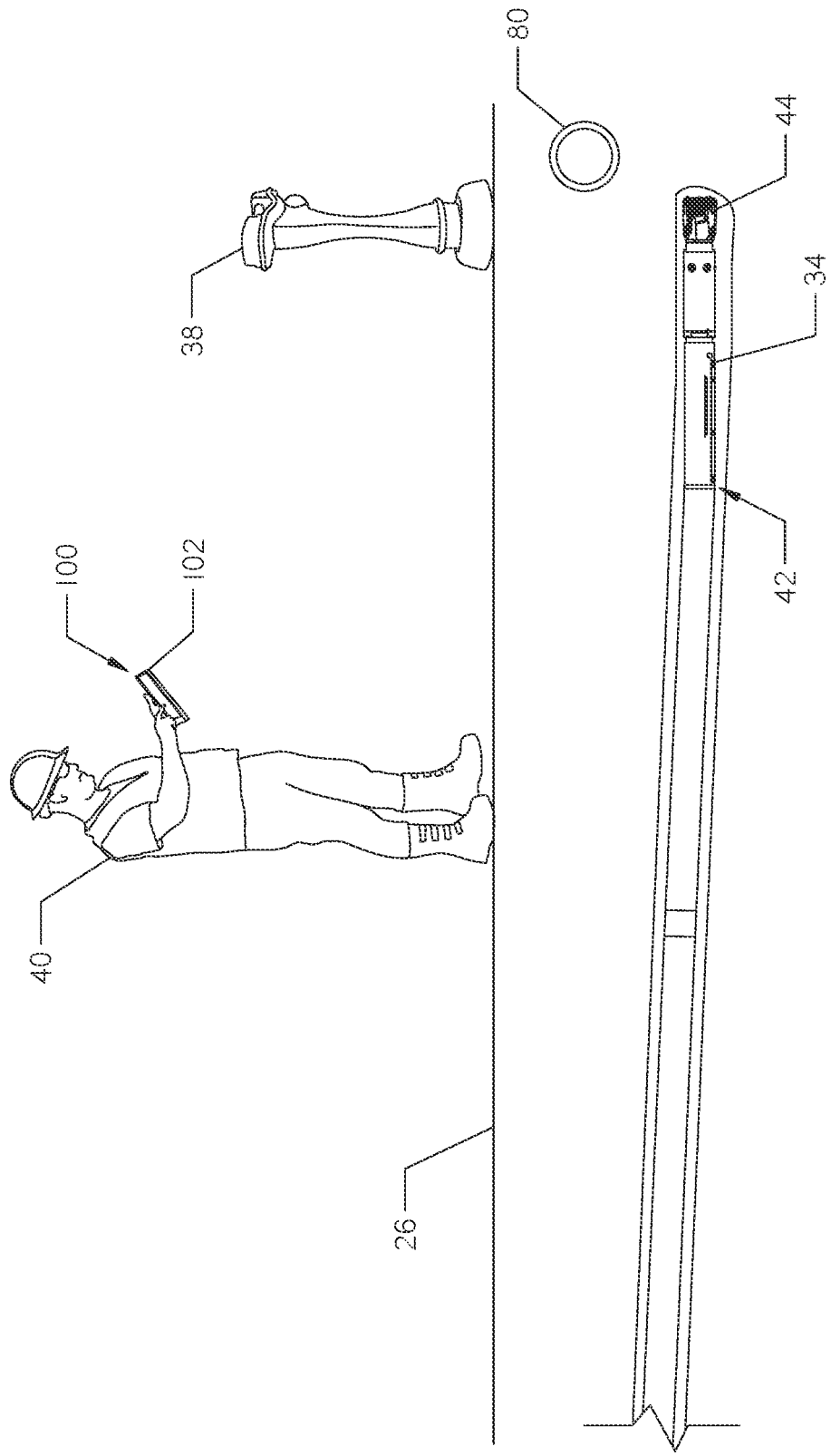
FIG. 9 is an illustration of the tracker operator using another embodiment of an augmented reality device during a horizontal drilling operation.

In an alternative embodiment, the downhole tool 34 may be deflected in different directions by a bent sub 42 included in the drill string 14, as shown in FIG. 9. The downhole tool 34 may carry a traditional tri-cone bit 44 if the drill string 14 includes a bent sub 42. In further alternative embodiments, an asymmetrical drill bit or a deflection shoe may be used to steer the downhole tool.

Continuing with FIG. 1, the drill rig 22 rotates the downhole tool 34 by rotating the drill string 14. When steering, the drill rig 22 pushes the drill string 14 forward without rotation. Once the downhole tool 34 has been redirected to the direction it needs to bore, the drill string 14 is continually rotated again. The downhole tool 34 bores straight in the direction and angle it is facing when the downhole tool 34 and drill string 14 are continually rotated.

By its nature, the focus of the drilling activity, the downhole tool 34, is out of sight of the operators. The position and orientation of the downhole tool 34 is traditionally interpreted by the rig and tracker operator 28 and 40 using icons and technical data displayed on a user interface. The tracker operator 40 must be skilled at interpreting the technical data in order to accurately track the downhole tool 34. Similarly, the rig operator 28 must be skilled at interpreting the technical data in order to effectively steer the downhole tool 34 underground along a desired borepath. The present disclosure is directed to a system that uses augmented reality to assist the tracker operator 40 in tracking the downhole tool 34 and the rig operator 28 in steering the downhole tool 34.

Figure 2:
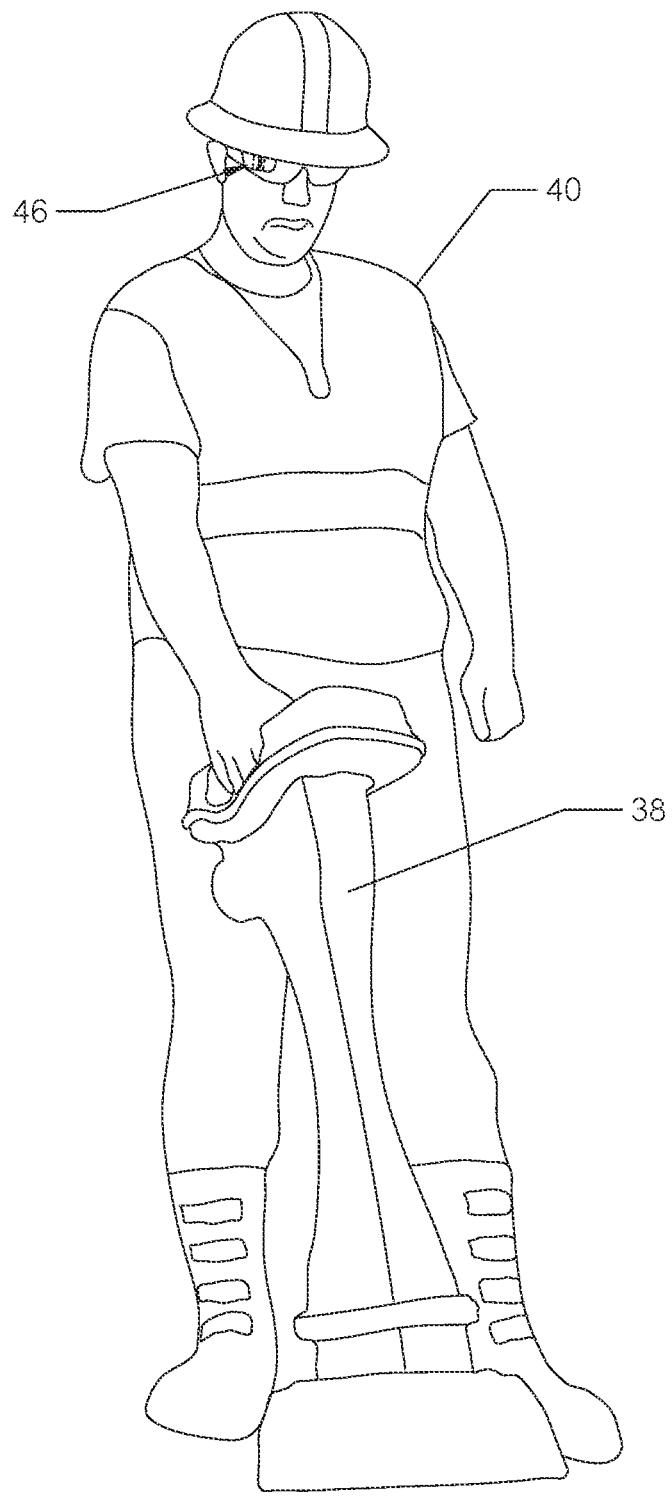
FIG. 2 is an illustration of a tracker operator wearing one embodiment of an augment reality device.
Figure 3:
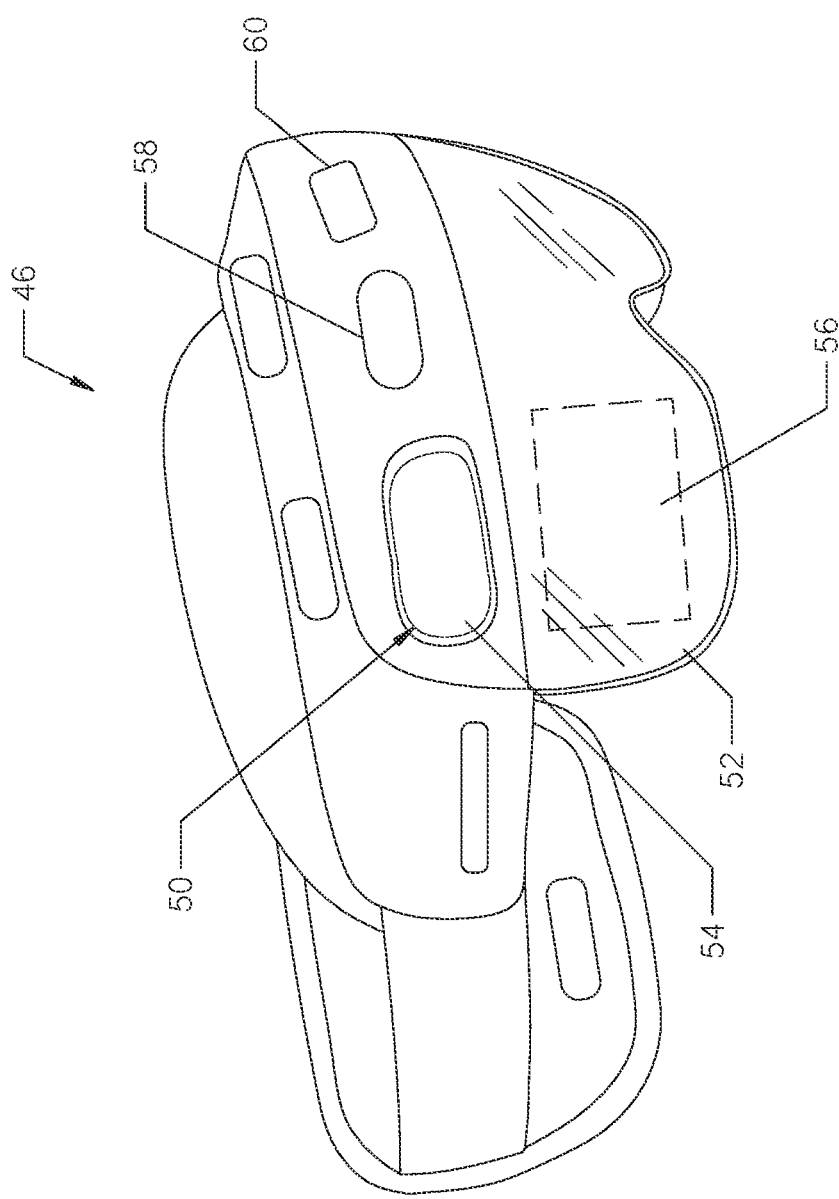
FIG. 3 is a perspective view of the augmented reality device shown in FIG. 2.

With reference to FIG. 3, one embodiment of an augmented reality (AR) device 46 is shown. The AR device 46 is a head-mounted device, as shown in FIG. 2. The head-mounted device is a traditional heads-up-display. In alternative embodiments, the head-mounted device may be attached to a hard hat or an elastic head strap.

The AR device 46 comprises a camera 50 supported immediately adjacent a translucent lens 52. The camera 50 comprises a lens 54 having a field of view. The translucent lens 52 has a field of view that overlaps the field of view of the camera's lens 54. The AR device 46 further comprises a screen 56 that is incorporated into the translucent lens 52.

Continuing with FIG. 3, one or more sensors 58 are supported on the AR device 46. The sensors 58 comprise one or more of the following: a GNSS receiver, an ultra-wide range beacon, an inclinometer, a compass, an accelerometer, a capacitive sensor, a resistive touch sensor, an elevation sensor, a gyroscope, a magnetometer, time-of-flight sensor, and/or an altimeter. The sensors 58 may further comprise other sensors known in the art for use with augmented reality devices.

The camera 50, screen 56, and sensors 58 communicate with a controller. The controller may be supported on the AR device 46, like the controller 60 shown in FIG. 3. Alternatively, the controller may be supported remotely from the AR device 46.

The controller also communicates with the tracker 38. In operation, the tracker 38 gathers information about the downhole tool 34, including its position and orientation, and transmits such information to the controller. At the same time, the sensors 58 measure a position and orientation of the AR device 46 and transmit such information to the controller. The controller analyzes information from the tracker 38 and the sensors 58 and determines a position and orientation of the downhole tool 34 relative to the AR device 46.

Figure 4:
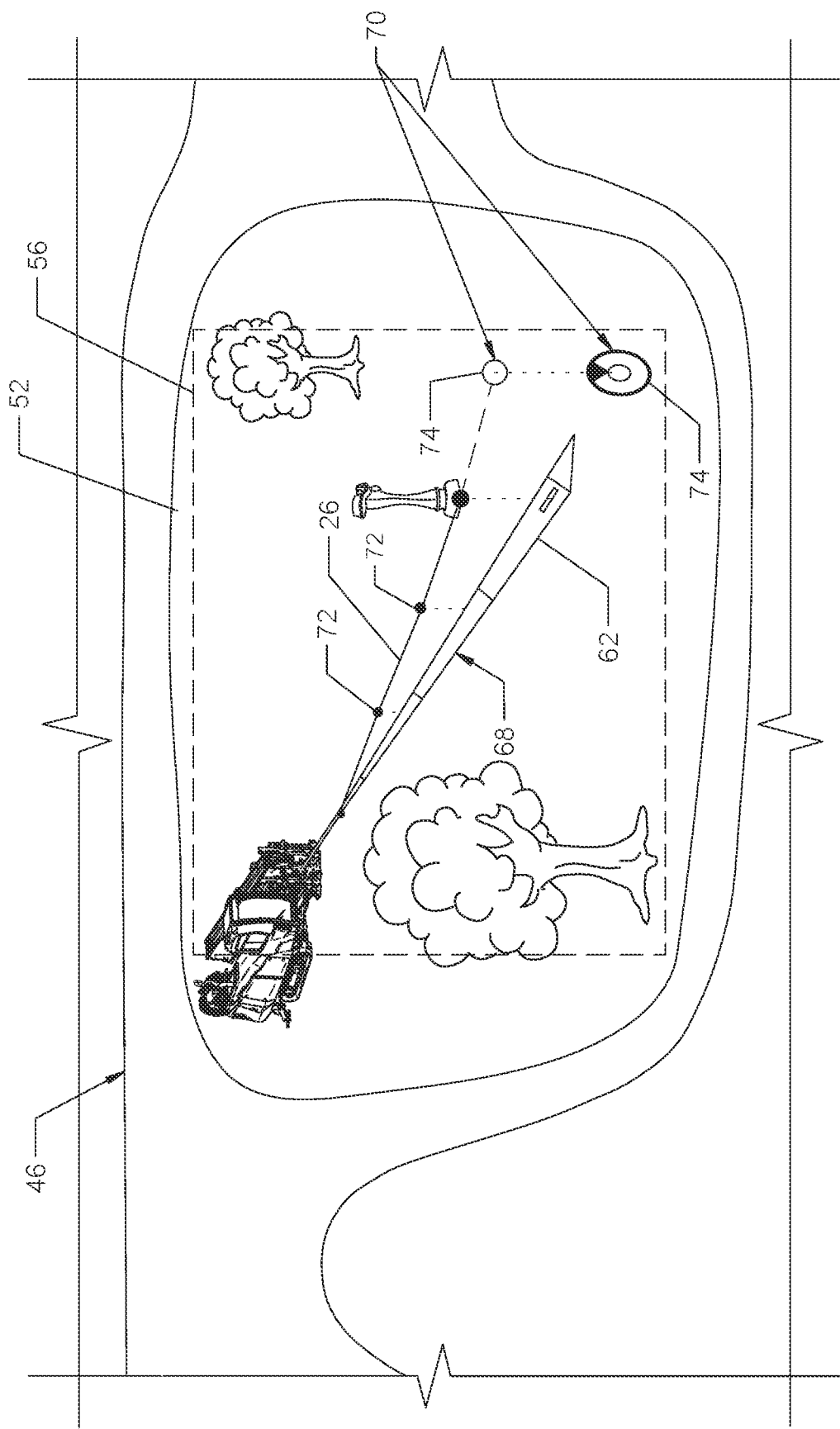
FIG. 4 is a view through the translucent lens of the augmented reality device of FIG. 3, showing one embodiment of virtual images displayed on a screen included in the lens. The virtual images are viewed from the perspective of the tracker operator standing to the side of the downhole tool.
Figure 5A:
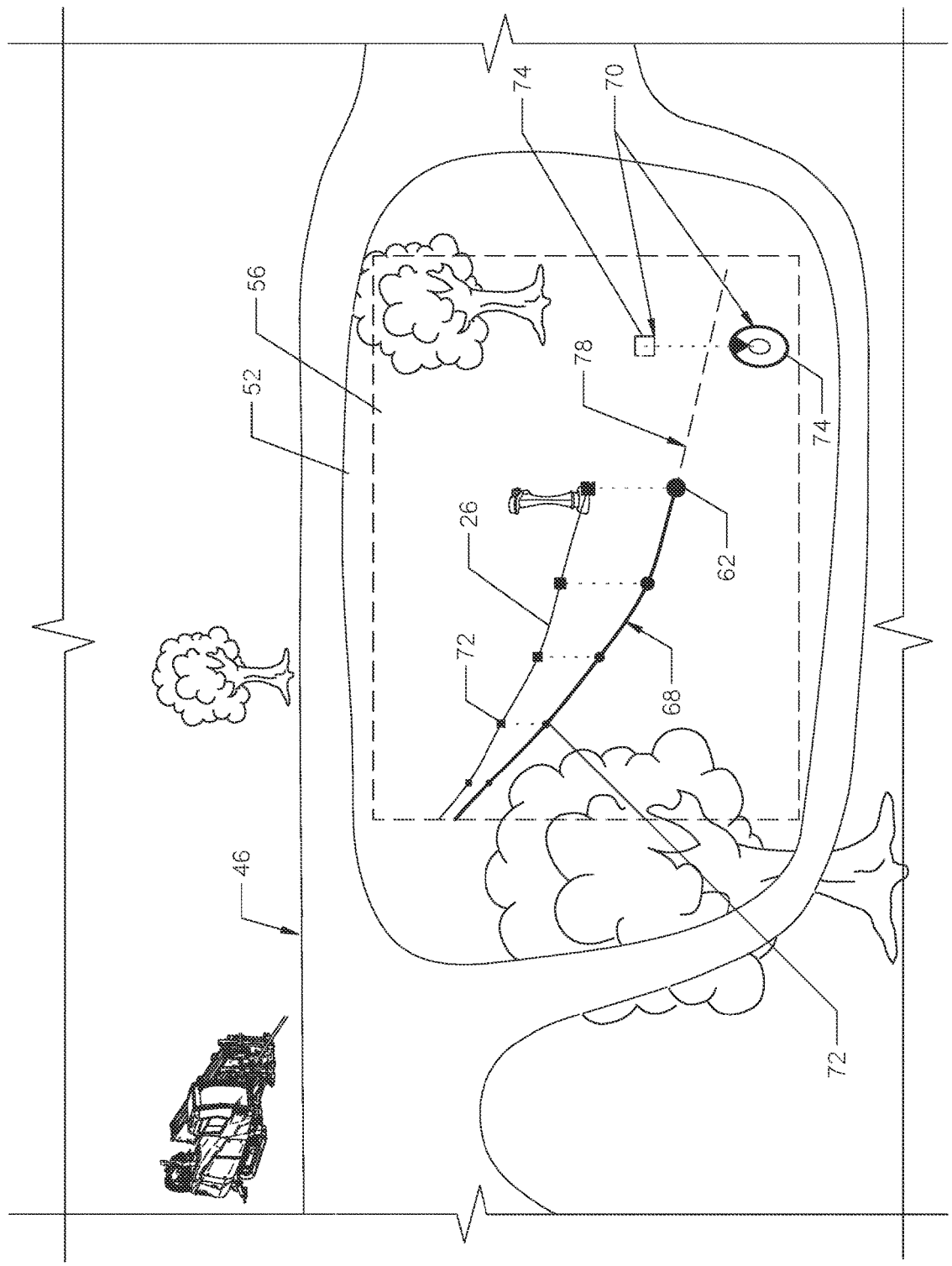
FIG. 5A is the same view as shown in FIG. 4, but depicting another embodiment of virtual images displayed on the screen.
Figure 5B:
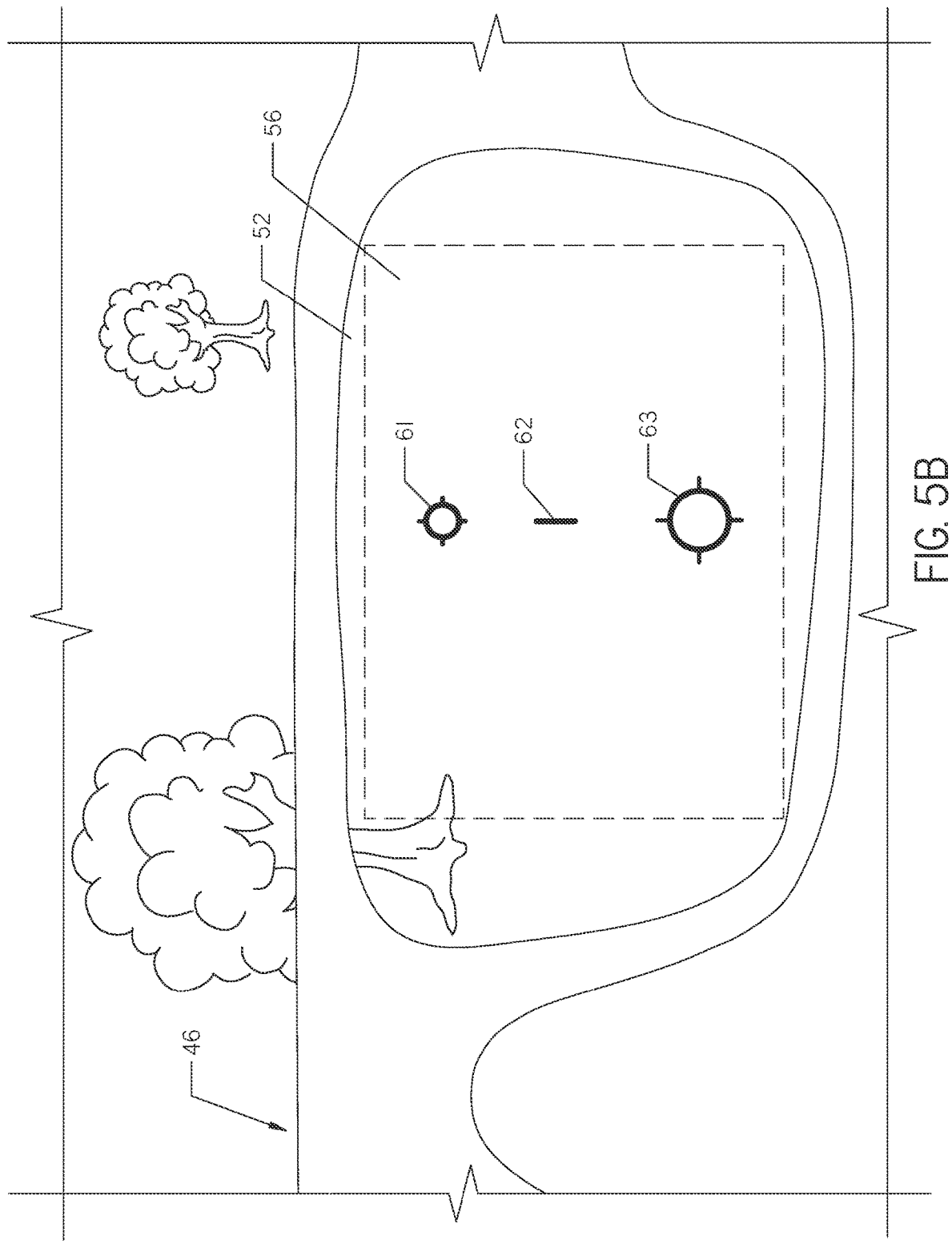
FIG. 5B is a view through the translucent lens of the augmented reality device of FIG. 3, showing one embodiment of virtual images displayed on a screen included in the lens. The virtual images are viewed from the perspective of the tracker operator standing behind the downhole tool.

Turning to FIGS. 4 and 5, following such analysis by the controller, the controller generates a virtual image of the downhole tool 62. The virtual image of the downhole tool 62 is incorporated into the images captured by the camera 50 to create a composite image. The controller displays the composite image on the screen 56 such that the virtual image of the downhole tool 62 is superimposed within the field of view of the translucent lens 52. The virtual image of the downhole tool 62 may be an actual artistic representation of the downhole tool 34, as shown in FIG. 4. Alternatively, the virtual image of the downhole tool 62 may be a circle, as shown in FIG. 5A, or a dash, as shown in FIG. 5B. In further alternative embodiments, the downhole tool 34 may be represented by any graphic desired.

An operator wearing the AR device 46 views the virtual image of the downhole tool 62 in combination with the operator's surrounding environment. The virtual image of the downhole tool 62 is positioned on the screen 56 at its determined position relative to the ground surface 26. The position and orientation of the virtual image of the downhole tool 62 is updated in response to new information from the tracker 38 or the sensors 58. For example, if the tracker 38 sends information to the controller indicating that the downhole tool 34 has moved, the controller will move the position of the virtual image of the downhole tool 62 displayed on the screen 56.

The AR device 46 may be worn by the tracker operator 40, as shown in FIG. 2. As the tracker operator 40 tracks the downhole tool 34 using the tracker 38, the operator 40 may occasionally step away from the tracker 38 in order to get a realistic perspective of the downhole tool's position and depth. The AR device 46 may be configured to display the virtual image of the downhole tool 62 in 2D and 3D. For example, if the AR device 46 is positioned directly above the downhole tool 34, the virtual image of the downhole tool 62 may appear in 2D, as shown in FIG. 5B. As the AR device 46 is moved away from the downhole tool 34, the virtual image of the downhole tool 62 may be displayed in 3D, as shown in FIGS. 4 and 5A. The controller may be configured to automatically toggle the virtual image of the downhole tool 62 between 2D and 3D views based on the position of the AR device 46 relative to the downhole tool 34.

The depth of the downhole tool 34 may be represented by placement of the virtual image of the downhole tool 62 relative to the ground surface 26, as shown for example in FIG. 4. The actual depth may also be identified for the tracker operator 40 on the screen 56, as shown for example in FIG. 6. Alternatively, the depth may be identified in other indirect ways, such as displaying the virtual image of the downhole tool or its surrounding environment in different colors or patterns that correspond to different depths.

With reference to FIG. 5B, when tracking the downhole tool 34, the tracker operator 40 looks for the front and rear null points of the beacon signal 34. A method for identifying a location of the front and rear null point is described in U.S. Patent Publication No. 2020/0072983, authored by Cole, et al., the entire contents of which are incorporated herein by reference. A virtual image representing a front null point 61 and a virtual image representing a rear null point 63 of the beacon signal 34 may be displayed for reference on the screen 56, as shown in FIG. 5B. The null points may be displayed for reference in the various other views described herein, if desired.

Figure 6:
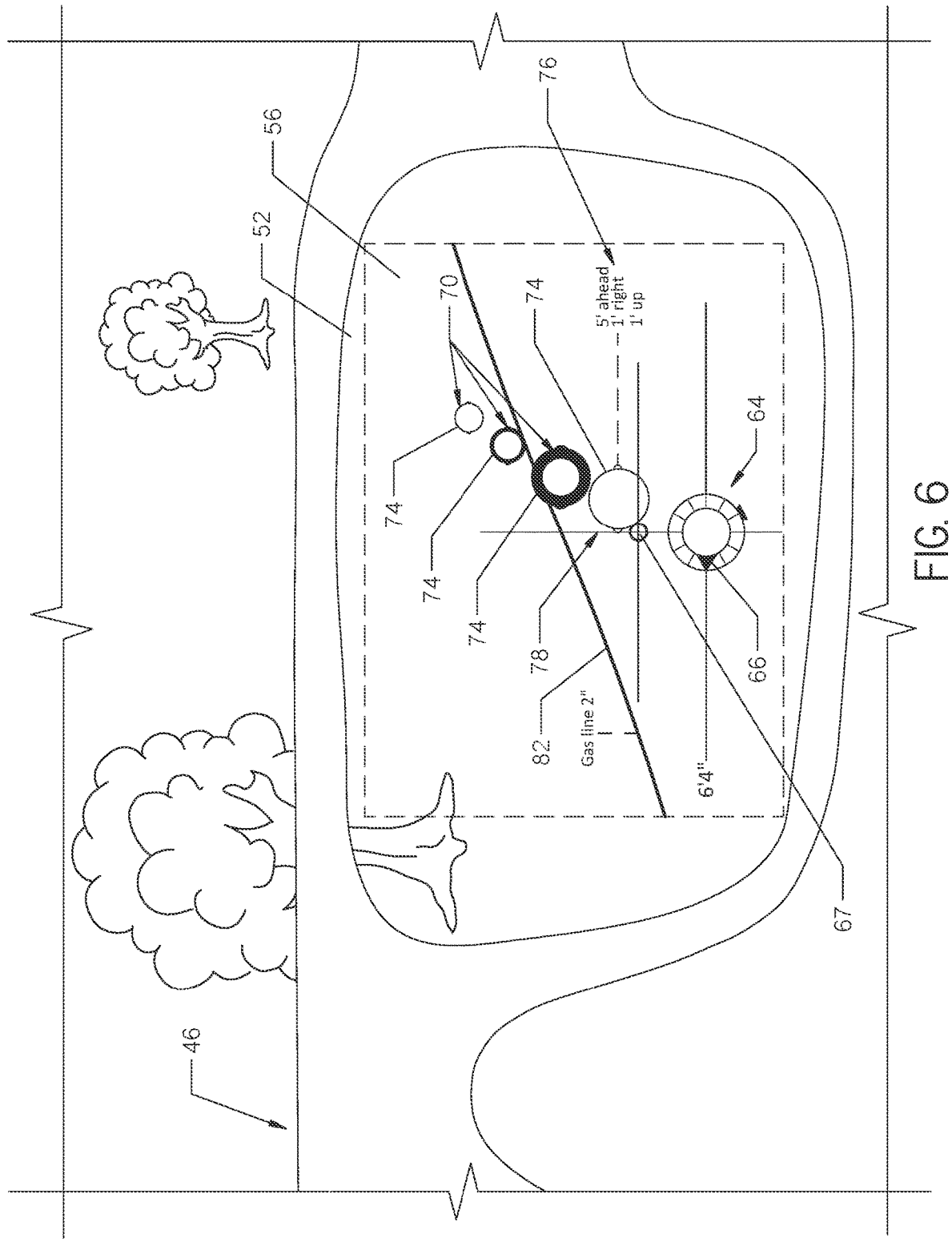
FIG. 6 is a view through the translucent lens of the augmented reality device of FIG. 3, showing one embodiment of virtual images displayed on a screen included in the lens. The virtual images are viewed from the perspective of a rig operator positioned at the operator station and are considered to be displayed in a "drilling view".

Continuing with FIGS. 4-6, the controller may generate virtual images about the operating parameters of the downhole tool 34 and display such images on the screen 56. For example, the controller may display the beacon temperature, the downhole fluid pressure, the downhole tool's roll position, battery life, and the like. A controller located at the operator station 30 may also transmit information about the drill rig 22 to the AR device 46 for display on the screen 56. For example, the amount of torque and thrust currently being applied to the drill string 14 may be displayed for the tracker operator 40.

The AR device 46 may also be worn by the rig operator 28. The rig operator 28 may view the virtual image of the downhole tool 62, as shown in FIGS. 4 and 5. Alternatively, the rig operator 28 may view the downhole tool 34 as if the operator is positioned immediately behind the downhole tool 34 within the borehole 12, as shown in in FIG. 6. Such view is referred to herein as the "drilling view". A position of the downhole tool 34 is represented by a virtual image 64 in the drilling view. A roll position of the downhole tool 34 is represented by an arrow 66 incorporated into the virtual image 64. The depth of the downhole tool 34 may be stated on the screen 56, as shown for example by the notation 6'4" in FIG. 6. A position of the ground surface 26 relative to the downhole tool 34 may be displayed by a virtual line 67 in the drilling view.

Turning back to FIGS. 4 and 5, the controller may also generate and display a virtual image of the actual borepath 68 created by the downhole tool 34 during operation. The virtual image of the actual borepath 68 may include an artistic representation of the drill string 14, as shown in FIG. 4. Alternatively, the virtual image of the actual borepath 68 may be a line, as shown in FIG. 5. The underground position of the actual borepath is determined using information previously received about the position and orientation of the downhole tool 34 as it bores underground.

Continuing with FIGS. 4 and 5, the controller may generate and display a virtual image of the planned borepath 70. The virtual image of the planned borepath 70 may be displayed as a plurality of past and upcoming waypoints 72 and 74. The waypoints 72 and 74 may be displayed along the ground surface 26 overlaying the planned borepath and relative to the ground surface 26 at their desired depths, as shown for example, by the upcoming waypoint 74. Past waypoints 72 may be connected by a line to represent the actual borepath.

Turning back to FIG. 6, only the upcoming waypoints 74 may be displayed in the drilling view. The upcoming waypoints 74 may be displayed as a series of rings. The rings provide targets for the rig operator 28 to steer the downhole tool 34 towards during operation. The controller may also display a set of steering instructions on the screen 56, as shown for example by the instructions 76. The steering instructions direct the rig operator 28 how to steer the downhole tool 34 towards the next waypoint 74.

The position of the planned borepath may be determined prior to starting boring operations. For example, an operator may walk along the ground surface overlaying a desired borepath and take GPS measurements of desired waypoints. A GPS measurement may be taken every 10 feet, for example. Desired depth measurements may be associated with each waypoint. Data gathered for the planned borepath is transmitted to the controller for use in generating the virtual image of the planned borepath 70. A method of planning the borepath and generating steering instructions is described in more detail in U.S. Patent Publication No. 2017/0226805, authored by Cole, the contents of which are incorporated herein by reference.

Continuing with FIGS. 5 and 6, the controller may also generate a virtual image of a projected uncorrected borepath 78. The projected uncorrected borepath represents the direction the downhole tool 34 will bore, based on its current position and orientation, if not steered differently. The virtual image of the projected uncorrected borepath 78 is a set of dashed lines in FIG. 5 and a straight line in FIG. 6. In alternative embodiments, the virtual image of the projected uncorrected borepath may be a runway, series of rings, or the like.

During boring operations, the downhole tool 34 must be steered around or away from any underground obstacles, such as a utility line 80 shown in FIG. 9. The controller may generate and display a virtual image of underground obstacles 82, such as the utility line shown in FIGS. 6 and 12. Underground obstacles may be located and displayed in accordance with the methods described in more detail later herein. If the planned borepath is nearing an underground obstacle, the upcoming waypoints 74 may be highlighted in some fashion, as shown in FIG. 6.

The controller may be configured to alert the tracker or rig operator 40 and 28 when approaching an obstacle. For example, a warning sign may appear on the screen 56. Such warning may state the current distance between the obstacle and the downhole tool 34. The controller may also be configured to produce an audible alarm when approaching an underground obstacle.

Figure 7:
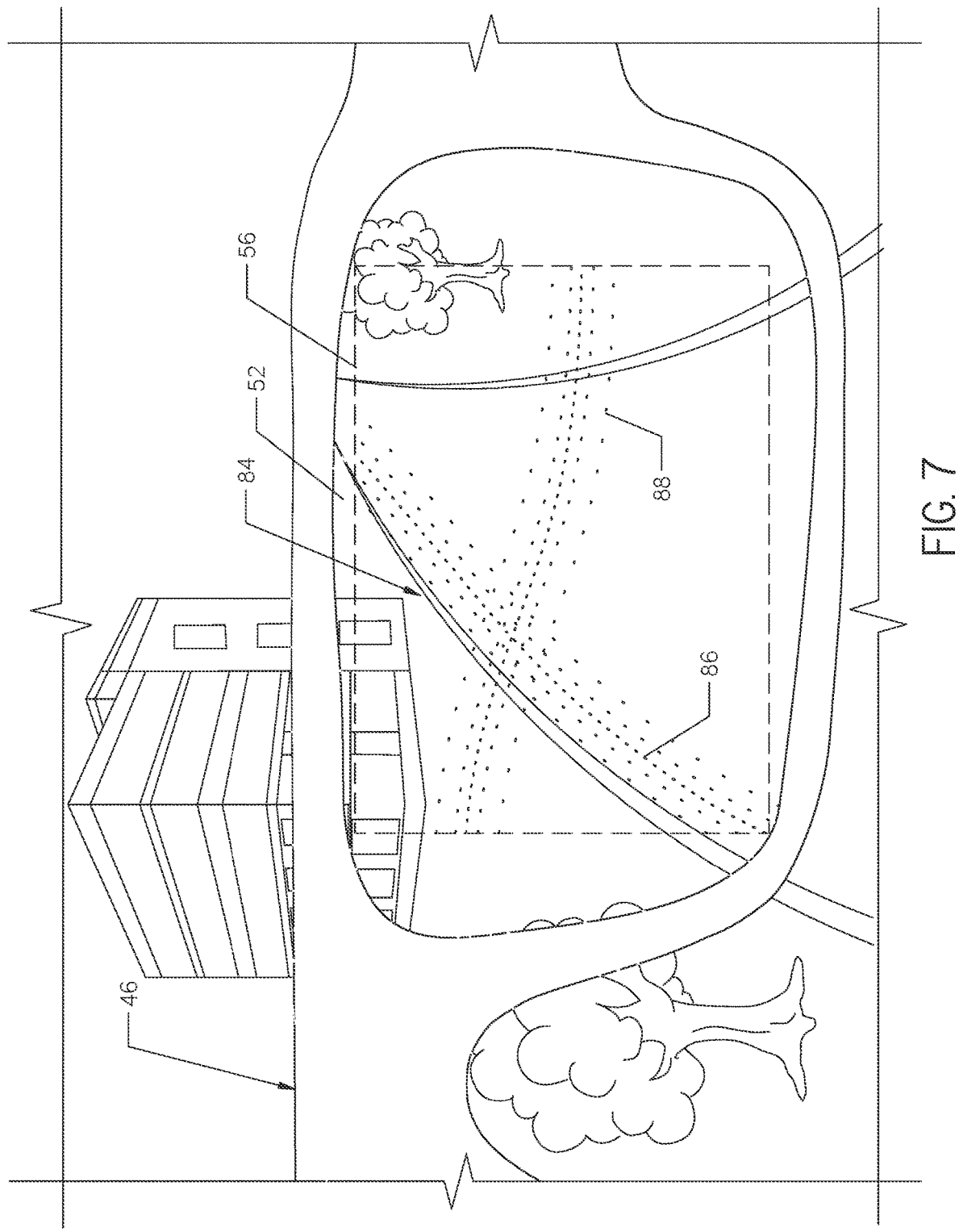
FIG. 7 is a view through the translucent lens of the augmented reality device of FIG. 3, showing a virtual image of a heat map depicting the location of underground obstacles.

With reference to FIG. 7, the underground obstacles may be identified on the screen 56 using a heat map 84. For example, the underground location of existing utility lines may be represented by shading the ground surface 26 overlaying the lines in red, as shown by the dense dots 86. The shading displayed on the screen 56 may transition to green in areas farther away from the utility lines, as shown by the less dense dots 88. If the downhole tool 34 needs to bore below or above and exiting utility line, the same shading may be displayed in 3D when analyzing the depth of the tool 34.

During operation, the rig operator 28 and the tracker operator 40 will want to maintain the downhole tool 34 within green shaded areas. The heat map 84 may also be used to assist the rig operator 28 in maintaining the downhole tool 34 on the planned borepath. Areas surrounding the planned borepath may be shaded green, while areas farther away from the planned borepath may transition to red.

Turning back to FIG. 1, during operation, electromagnetic signals from nearby objects may interfere with the tracker's ability to detect the beacon signal 36. The degree of interference may vary across different frequencies and at different locations along the desired borepath. Thus, it may be desirable for the tracker operator 40 to detect the beacon signal 36 on varying frequencies throughout the duration of the drilling operation. A method for determining the preferred frequencies the beacon signal 36 should be tuned to during the drilling operation is described in U.S. Pat. No. 9,971,013, issues to Cole et al., the contents of which are incorporated herein by reference.

The controller may be programmed with the preferred frequencies for the beacon and tracker 38 along a planned borepath and display on the preferred frequency on the screen 56. As the tracker operator 40 continually tracks the downhole tool 34, the controller may notify the operator 40 if the frequency needs to be modified. The controller may also highlight portions of the planned borepath displayed on the screen 56 that have high interference.

When tracking the downhole tool 34, the detected position of the downhole tool 34 may not always be 100% accurate. For example, any interference with the beacon signal 36 may cause the identified position of the downhole tool 34 to be slightly inaccurate. The accuracy may vary over the different available frequencies based on the amount of interference present at each frequency. The controller may calculate the maximum positional deviation for the downhole tool 34 at each frequency using the given measurement uncertainty of the tracker 38.

The controller may subsequently indicate a maximum positional deviation of the virtual image of the downhole tool 62 on the screen 56. The controller may generate the virtual image of the downhole tool 62 at its detected position on each available frequency. Each image may be simultaneously displayed on the screen 56 so that the tracker operator 40 can analyze the maximum positional deviation for the downhole tool 34 at each available frequency. The tracker operator 40 may continue tracking the downhole tool 34 using the frequency that results in the lowest maximum positional deviation.

If any uncertainty exists as to the location of an underground obstacle, the maximum positional deviation of the virtual image of underground obstacles 82 may be displayed on the screen 56. Positional uncertainty of the virtual images of the downhole tool 62 and the obstacles 82 may be displayed using visual indicators, such as color or graphs.

The proximity between the maximum positional deviation of the virtual image of the downhole tool 62 and the virtual image of underground obstacles 82 is monitored by the controller and the tracker operator 40. The controller may warn the operator 40 or 28 on the screen 56 and audibly if the positional deviations for the virtual images of the downhole tool 62 and the obstacles 82 overlap or are projected to overlap. Color may also be used to indicate any overlap.

Turning back to FIG. 1, after the borehole 12 is created, a pipeline is normally installed within the borehole 12. The pipeline usually has a larger diameter than that of the borehole 12. The controller may generate and display a virtual image of the pipeline to be installed within the borehole using the known measurements of such pipeline. Displaying the pipeline allows the operators 40 and 28 to visualize the location of the pipeline compared to any underground obstacles. The pipeline to be installed may be displayed when planning the borepath in order to compare the size of the pipeline to the size of existing underground obstacles. The pipeline may also be viewed while drilling by superimposing the virtual image of the pipeline over the virtual image of the actual borepath 68.

Figure 8:
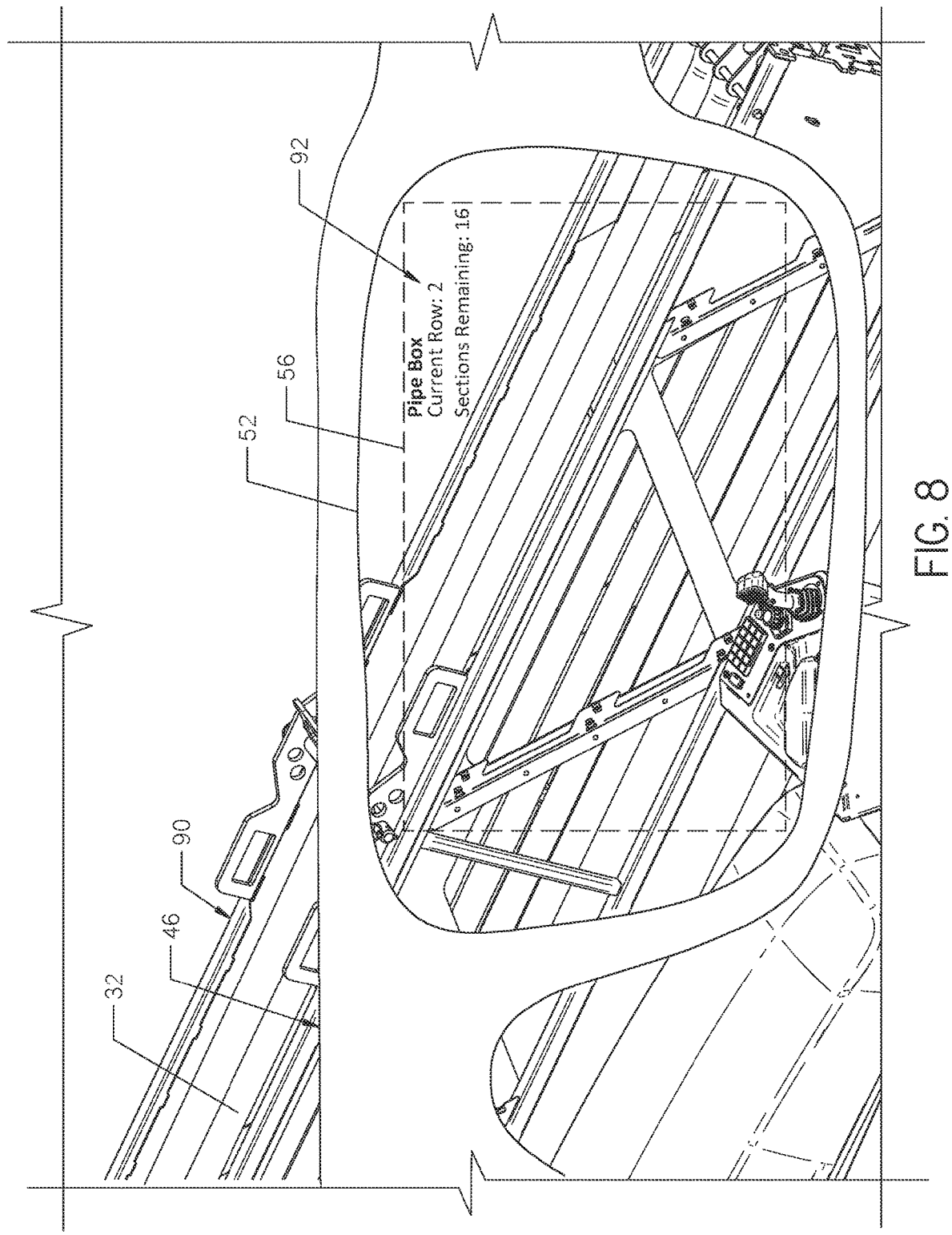
FIG. 8 is a view through the translucent lens of the augmented reality device of FIG. 3, showing a pipe box supported on the drill rig and a virtual image of a parameter of the pipe box displayed on a screen included in the lens.

Turning to FIG. 8, the controller may generate virtual images of information about the operational parameters of the drill rig 22. Such information may be transmitted to the controller from a controller included in the operator station 30. Such information may include, for example, the drilling fluid tank level, fuel level, engine operational parameters, carriage operational parameters, pipe box parameters, numbers of pipes added to the drill string 14, distance drilled, and the like. Such information may be displayed on the screen 56 if the operator is near the drilling rig 22. For example, such information may be displayed for a rig operator 28 when sitting at the operator station 30 or walking around the drill rig 22.

Various drilling parameters may be displayed in response to the corresponding component of the drill rig 22 coming into the field of view of the AR device 46. The controller may use measurements from a time-of-flight sensor included in the sensors 58 to determine which parameters to display. The time-of-flight sensor may be configured to identify different features and components of the drill rig 22. For example, a pipe box 90 is supported on the drill rig 22 within the rig operator's field of view, as shown in FIG. 8. A virtual image of parameters for the pipe box 92 may be displayed for the rig operator 28 if the rig operator looks at the pipe box 90. The virtual image 92 shown in FIG. 8 indicates that the pipe sections 32 are currently being removed from the second row of the pipe box 90 and sixteen pipe sections 32 remain in the pipe box 90.

Any issues with the drill rig 22 may pop up on the screen 56 as the issue arises. For example, if the drill rig 22 is almost out of drilling fluid, a warning may pop-up on the screen 56. As another example, an alert may pop-up on the screen 56 notifying the rig operator 28 that the engine needs maintenance.

The AR device 46 may be controlled using hand gestures. For example, the screen 56 may cycle through various possible information using taps, bumps, or waves. The sensors 58 may include ultrasonic sensors configured to recognize the hand gestures. For example, an accelerometer may sense taps or bumps to the AR device 46, or capacitive or resistive touch sensors may sense pressure. Alternatively, the camera may sense motion immediately adjacent the AR device 46. Buttons may also be included on the AR device 46 in order to cycle through information displayed on the screen 56.

The same type of gestures may also be used to control the drill rig 22. The controller in communication with the AR device 46 may communicate with the controller at the operator's station 30. Using such communication, functions traditionally controlled by buttons, switches, or a touch screen in the operator station 30 may be controlled by the AR device 46. However, extra confirmation may be required to prevent unintentional operations.

The AR device 46 may utilize a dead-reckoning system to locate the position of the downhole tool 34 rather than using data gathered by the tracker 38. In a dead-reckoning system, the downhole tool 34 may include a plurality of sensors, such as a gyro, magnetometer, accelerometer, and the like. Data measured by the sensors may be transmitted to the controller in communication with the AR device 46. The controller may analyze such information and determine a position of the downhole tool 34 relative to the AR device 46.

Various combinations of the virtual images of the actual borepath 68, planned borepath 70, projected uncorrected borepath 78, downhole tool 62, underground obstacles 82, and other parameters may be displayed in juxtaposition with one another on the screen 56, as shown in FIGS. 4-6. The operator 40 or 28 may select the combinations or views of the virtual images to be displayed, as desired. The virtual images may be displayed in 2D or 3D, depending on the position of the AR device 46 relative to the actual displayed items. Likewise, the displayed items may be modified on the screen 56 as the operator moves the AR device 46. For example, when looking at FIG. 4, if the operator moves his head to the right, more of the upcoming waypoints 74 may appear.

With reference to FIG. 9, another embodiment of an AR device 100 is shown. The AR device 100 may comprise a computer having a camera and a display screen, such as a laptop, tablet or smartphone. A tablet 102 is shown in FIG. 9. The tablet 102 has a camera and a screen. The camera includes a lens having a first field of view. Images captured by the camera within the field of view of the lens are displayed on the screen. The tablet 102 includes the same controller and one or more sensors 58 used with the AR device 46. The controller creates the same virtual images displayed on the AR device's screen 56 and superimposes the virtual images over the images displayed on the tablet's screen. In operation, the tracker operator 40, for example, may occasionally hold the tablet 102 above ground surface 26 overlaying the downhole tool 34 to see the virtual image of the downhole tool 62, rather than wear the AR device 46.

Figure 12:
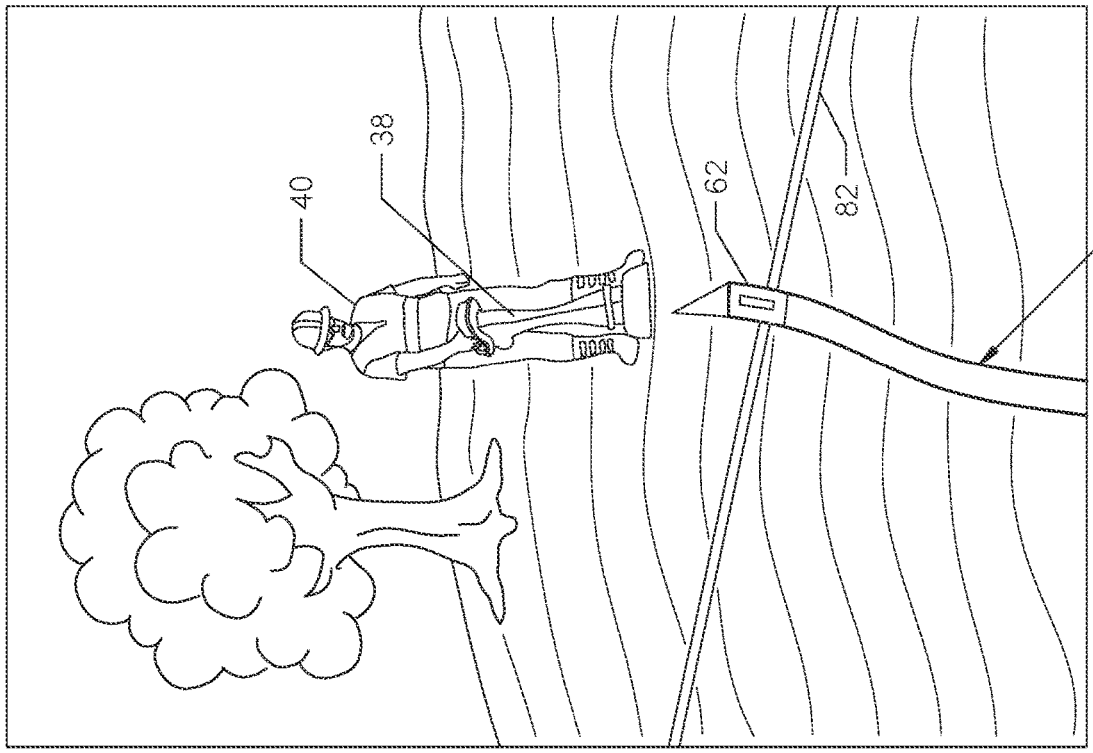
FIG. 12 is the image shown in FIG. 11 with virtual images superimposed over the original image.
Figure 11:
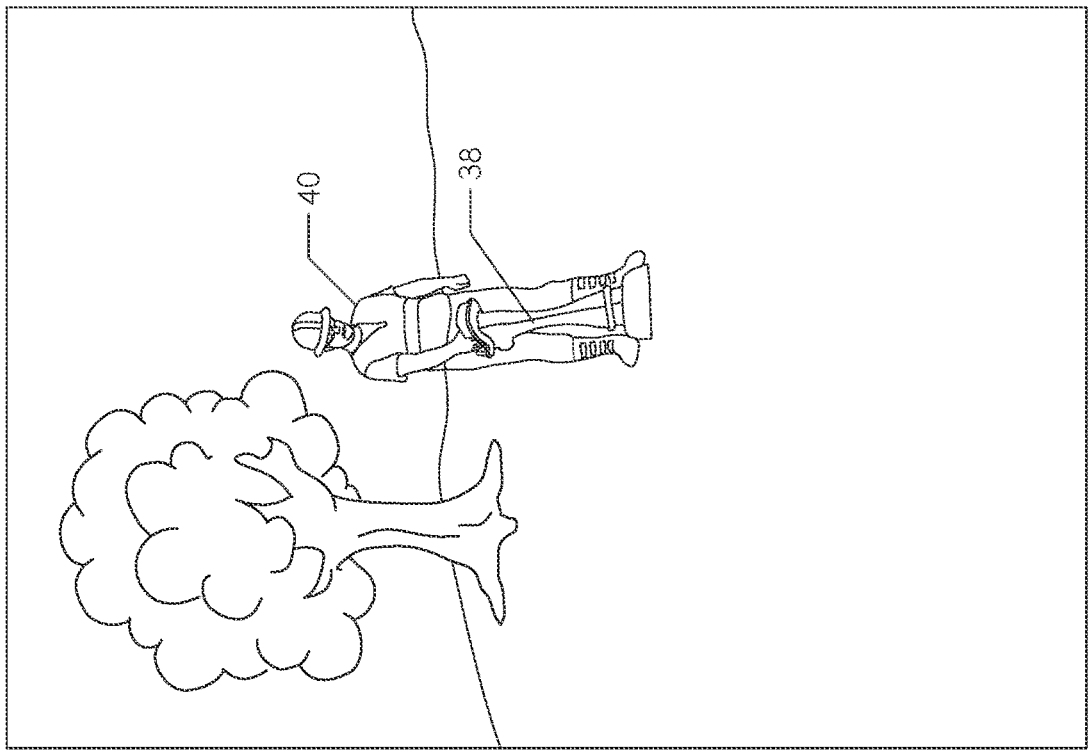
FIG. 11 is an image captured by the camera used with the augmented reality device shown in FIG. 10.

With reference to FIG. 10, another embodiment of an AR device 200 is shown. The AR device 200 comprises a camera 202 in communication with a remote screen 204. The camera 202 is supported on the front of the operator station 30 facing the desired borepath. The camera 202 transmits images of the above-ground operations to the screen 204, as shown in FIG. 11. The controller and sensors 58 are included in the operator station 30 and communicate with the camera 202 and the screen 204. The controller generates and superimposes the previously described virtual images on the images displayed on the screen 204, as shown in FIG. 12. During operation, the rig operator 28 may manipulate the view shown on the screen 204 in order to see different views of the virtual images relative to the ground surface 26.

The AR devices 46, 100, or 200 may be configured to allow for a virtual fly-by of the drilling operation and planned borepath. The fly-by could be used to view virtual images of upcoming waypoints 74 and underground obstacles 82. The virtual fly-by may be generated by overlaying virtual images of waypoints 74 and underground obstacles 82 over aerial maps that have been downloaded to the corresponding controllers.

The AR devices 46, 100, or 200 may also be used for locating and mapping the underground obstacles, such as the utility line 80 shown in FIG. 9. In locating operations, a locator operator locates the position of an underground obstacle in three dimensions using a portable, above-ground locating device. The locating device may look similar to the tracker 38, shown in FIG. 1.

The locator uses one or more antennas to detect active or passive electromagnetic signals emitted from an underground obstacle. Some underground obstacles, like a gas line, do not naturally emit a detectable signal. In such case, a transmitter may be coupled to the obstacle to cause it to emit an electromagnetic field having a circular field shape. The locator operator subsequently maneuvers the locator above the obstacle to locate its position and depth.

A positioning system, such as high accuracy GPS, is used to determine the position of the locating device in 3D space upon detection of the underground obstacle. The position of the locating device in combination with the data detected by the locating device is used to produce maps or models of 3D locations of the underground obstacles. The data obtained from the locator and the positioning system may be transmitted to the controller used with the AR devices 46, 100, and 200. The controller uses the data to generate and display the virtual images of the underground obstacles 82 on the screen 56 or 204, as shown in FIGS. 6 and 12.

In some cases, the approximate location of underground obstacles may already be known. Such location may be recorded in a vector data format, such as a shapefile. The file may contain the GPS location, line type, material, age, or depth of the obstacle. Before starting a locating operation, such information may be transmitted to the controller in communication with the AR device 46, 100, or 200. The controller may use the information to generate and display the virtual images of the underground obstacles 82 on the screen 56 or 204. If the depth is included in the file, the depth may be displayed in 2D or 3D, as described above. Displaying such information on the AR device 46, 100, or 200 for the locating operator provides reference points for the operator during the locating operation.

The locating operator may determine that the actual location of the underground obstacles varies from the location identified in the vector data. If so, the controller will either update the location of the virtual image of the underground obstacle 82 or generate a new virtual image of the underground obstacle 82 using the data received from the locator. The controller may be configured to display the old virtual image in juxtaposition with the new virtual image of the underground obstacle 82, if desired. Alternatively, the old virtual image of the underground obstacle 82 may be removed from the screen 56 or 204. The controller may also be configured to automatically reposition the old virtual image of the underground obstacle 82 in response to a portion of the obstacle being located by the locating operator at a different position.

The controller may generate and display virtual images of other underground obstacles that may create electromagnetic interference, but will not necessarily impede the path of the downhole tool 34. For example, a virtual image of a nearby buried electric line may be displayed on the screen 56 or 204. Displaying such images helps the tracker operator 40 to be aware of any interference that may affect the operator's ability to accurately track the downhole tool 34. The maximum positional deviation of the virtual image of the downhole tool 62 or underground obstacles may increase in areas with increased interference.

The controller may display the frequency at which different underground obstacles were located on the screen 56 or 204. Different frequencies may be represented using different colors. For example, a gas line located at a frequency of 3.14 kHz may be highlighted blue. A single underground obstacle may also be detected by the locator at multiple frequencies along the length of the obstacle. In such case, the obstacle may be displayed having differently colored sections, each color corresponding to a different frequency.

A heat map of an underground obstacle, like the utility line 8o shown in FIG. 9, may also be created during the locate operation. The heat map may be similar to the heat map 84 shown in FIG. 7. As discussed above, an underground obstacle will emit an electromagnetic signal at a known frequency. The signal strength and direction of this electromagnetic signal may be detected by the locator. The signal's position in space is also recorded. Position may be recorded by the locator's onboard GNSS system. Alternatively, the AR device 46 may record the relative location of the locator with the camera 50 and/or sensors 58. Once a signal is received by the locator, along with corresponding location data, the controller may display a virtual colored marker on the screen 56 or 204.

The marker may provide an indication as to the signal strength and direction detected. As the locating operator walks forward or swings the locator from side to side, additional markers will be added to the screen. As new markers are logged, existing markers may be updated to reflect the additional data received. For example, a previously logged marker may change from green to yellow if newly added markers have a higher signal strength than the previously logged marker. The markers may also comprise a direction indicator, such as an arrow, to direct the locating operator to a position directly above the underground obstacle to be located. The locating operator may also look back at previously placed markers to ensure that he or she is consistently locating the underground obstacle.

Additional parameters related to locating the underground obstacle, may also be displayed on the screen 56 or 204. Such parameters may include the ground speed, mode used, antenna selection, width of swing, receiver estimated depth, receiver estimated current, transmitter connection type (direct, clamp, induction, etc.), transmitter current, transmitter voltage, transmitter load resistance/impedance, age of prior locate information, name of individual or entity who previously located the obstacle, and/or models or brands of locating equipment.

The data collected during the locating operation may be stored and uploaded for future use or display. For example, a virtual underground environment can be created to visualize one or more utilities and overlay them on a street map or other drawing. Such data could be used to plan any operation that requires the ground be disturbed. Visualizing the locating infrastructure and proposed excavation geometry would aid in planning the job and make the data easy to show to non-technical personnel.

In alternative embodiments, a virtual reality system may be used in place of the augmented reality system described herein. In such system, the controller would generate a virtual image of the operator's entire surroundings, and not just information related to the drilling operation. The augment or virtual reality system may be utilized for asset management and real-time observation by training personnel. Offboard or offsite trainees or managers could be allowed to view the same screen that is viewable to the tracker or rig operator 40 or 28.

Changes may be made in the construction, operation and arrangement of the various parts, elements, steps and procedures described herein without departing from the spirit and scope of the invention.

The invention claimed is:

1. A system, comprising:
    a drill rig supported on a ground surface;
    a downhole tool positioned beneath the ground surface, the downhole tool comprising one or more downhole sensors;
    a drill string having a first end and a second end, in which the first end of the drill string is attached to the downhole tool and the second end of the drill string is attached to the drill rig;
    an augmented reality device having a field of view and a screen, in which the screen depicts one or more images within the field of view;
    one or more device sensors supported on the augmented reality device and configured to determine a position of the augmented reality device relative to the downhole tool; and
    one or more controllers in communication with the augmented reality device, the one or more device sensors, and the one or more downhole sensors, in which the one or more controllers are configured to determine a position and orientation of the downhole tool, generate a virtual image of the downhole tool relative to the ground surface based on information received from the one or more downhole sensors, and display the virtual image on the screen; and
    in which the one or more controllers are configured to generate and display a heat map on the screen, in which the heat map indicates a position of the virtual image of the downhole tool relative to a planned borepath using information received from the one or more downhole sensors.

2. The system of claim 1, in which the downhole tool further comprises a beacon configured to emit a magnetic dipole field.

3. The system of claim 2, further comprising:
    a portable, above-ground tracker having an antenna configured to detect the magnetic dipole field emitted from the downhole tool.

4. The system of claim 1, in which the one or more controllers are further configured to generate a virtual image or images of underground obstacles within the field of view and display the virtual image or images of the underground obstacles on the screen.

5. The system of claim 4, in which the heat map further indicates the proximity of the downhole tool to the underground obstacles.

6. The system of claim 1, in which the position of the downhole tool in the virtual image is updated in response to updated information received by the one or more controllers from the one or more downhole sensors.

7. The system of claim 1, in which the one or more controllers are configured to generate a virtual image of an actual borepath created beneath the ground surface by the downhole tool and display the virtual image of the actual borepath on the screen.

8. The system of claim 1, in which the one or more controllers are configured to generate a virtual image of a projected borepath for the downhole tool, based on the position and orientation of the downhole tool, and display the virtual image of the projected borepath on the screen.

9. The system of claim 1, in which the one or more controllers are configured to generate a virtual image of the planned borepath and display the virtual image of the planned borepath on the screen.

10. A system, comprising:
    a drill rig supported on a ground surface;
    a downhole tool positioned beneath the ground surface, the downhole tool comprising a beacon configured to emit a magnetic dipole field;
    a drill string having a first end and a second end, in which the first end of the drill string is attached to the downhole tool and the second end of the drill string is attached to the drill rig;
    a portable above-ground tracker having an antenna configured to detect the magnetic dipole field;
    an augmented reality device having a field of view and a screen, in which the screen depicts one or more images within the field of view;
    one or more sensors supported on the augmented reality device and configured to determine a position of the augmented reality device relative to the downhole tool; and
    one or more controllers in communication with the augmented reality device, the one or more sensors, and the tracker, in which the one or more controllers are configured to determine a position and orientation of the downhole tool, generate a virtual image of the downhole tool relative to the ground surface based on information received from the tracker, and display the virtual image of the downhole tool on the screen; and
    in which the one or more controllers are configured to generate and display a heat map on the screen, in which the heat map indicates a proximity of the downhole tool relative to a planned borepath using the information received from the tracker.

11. The system of claim 10, in which the one or more controllers are further configured to generate a virtual image or images of underground obstacles within the field of view and display the virtual image or images of the underground obstacles on the screen.

12. The system of claim 11, in which the heat map further indicates the proximity of the downhole tool to the underground obstacles.

13. The system of claim 10, in which the one or more controllers are configured to generate a virtual image of an actual borepath created beneath the ground surface by the downhole tool and display the virtual image of the actual borepath on the screen.

14. The system of claim 10, in which the one or more controllers are configured to generate a virtual image of a projected borepath for the downhole tool, based on the position and orientation of the downhole tool, and display the virtual image of the projected borepath on the screen.

15. The system of claim 10, in which the one or more controllers are configured to generate a virtual image of the planned borepath and display the virtual image of the planned borepath on the screen.

16. A system, comprising:
a drill rig supported on a ground surface;
a pipe box supported on the drill rig, the pipe box configured to hold a plurality of pipe sections;
an augmented reality device having a field of view and a screen, in which the screen depicts one or more images within the field of view;
one or more sensors supported on the augmented reality device; and
one or more controllers in communication with the augmented reality device, the one or more sensors, and the drill rig, in which the one or more controllers are configured to generate one or more virtual images of information about at least one of a plurality of operational parameters for the drill rig and display the one or more virtual images on the screen; and
in which the one or more operational parameters comprise parameters for the pipe box, and in which the one or more controllers are configured to generate a virtual image of the parameters for the pipe box and display the parameters for the pipe box on the screen.

17. The system of claim 16, further comprising:
a downhole tool positioned beneath the ground surface; and
a drill string having a first end and a second end, in which the first end of the drill string is attached to the downhole tool and the second end of the drill string engages the drill rig.

18. The system of claim 17, further comprising:
a portable, above-ground tracker having an antenna configured to detect a magnetic dipole field emitted from the downhole tool;
in which the one or more controllers are in communication with the tracker and are configured to determine a position and orientation of the downhole tool, generate a virtual image of the downhole tool relative to the ground surface based on information received from the tracker and the one or more sensors, and display the virtual image of the downhole tool on the screen.

19. The system of claim 16, in which the one or more operational parameters further comprises maintenance notifications for the drill rig; and in which the one or more controllers are configured to generate a virtual image of the maintenance notifications and display the maintenance notifications on the screen.

20. The system of claim 16, in which the virtual image of the parameters for the pipe box is displayed on the screen in response to the appearance of the pipe box within the field of view of the device.

* * * * *

UNITED STATES PATENT AND TRADEMARK OFFICE
CERTIFICATE OF CORRECTION

PATENT NO. : 12,049,816 B2
APPLICATION NO. : 18/303766
DATED : July 30, 2024
INVENTOR(S) : Marshall et al.

It is certified that error appears in the above-identified patent and that said Letters Patent is hereby corrected as shown below:

In the Specification

Column 1, Line 45, please delete "augment" and substitute therefor "augmented".
Column 4, Line 30, please delete "SA" and substitute therefor "5A".
Column 4, Line 45, please delete "34" and substitute therefor "36".
Column 4, Line 51, please delete "34" and substitute therefor "36".
Column 5, Line 4, please delete the second occurrence of "in".
Column 6, Line 24, please delete "and exiting" and substitute therefor "an existing".
Column 6, Line 48, please delete the first occurrence of "on".
Column 10, Line 28, please delete "8o" and substitute therefor "80".

Signed and Sealed this
Twenty-seventh Day of August, 2024

Katherine Kelly Vidal
*Director of the United States Patent and Trademark Office*